United States Patent [11] 3,624,258

[72] Inventors Sachio Ishimoto
 Tokyo;
 Haruo Togawa, Iwakuni; Yuitsu Honda,
 Iwakuni, all of Japan
[21] Appl. No. 20,017
[22] Filed Mar. 16, 1970
[45] Patented Nov. 30, 1971
[73] Assignee Teijin Limited
 Osaka, Japan
[32] Priority Mar. 22, 1969
[33] Japan
[31] 44/21965

[54] PROCESS FOR THE PREPARATION OF ε-CAPROLACTONE
 8 Claims, No Drawings
[52] U.S. Cl. .................................................... 260/343
[51] Int. Cl. .................................................... C07d 9/00
[50] Field of Search ........................................ 260/343

[56] References Cited
 UNITED STATES PATENTS
 3,546,251 12/1970 Matsumoto et al. .......... 260/343

*Primary Examiner*—John M. Ford
*Attorney*—Sherman and Shalloway

ABSTRACT: Epsilon-caprolactone is prepared at high yields through an easy commercial operation by heating at least one compound selected from the group consisting of ε-hydroxycaproic acid, low polymerization products thereof and esters of said ε-hydroxycaproic acid and its low polymers, in the presence of a compound containing free alcoholic hydroxyl groups at such an amount that, when one ε-hydroxycaproic acid unit of the formula $$O-(CH_2)-_5CO$$

contained in said compound is calculated as one molecule of ε-hydroxycaproic acid, total number of free alcoholic hydroxyl groups present in the reaction system should exceed the total number of carboxyl groups present in the reaction system, under such temperature and pressure conditions as will allow distillation of ε-caprolactone.

PROCESS FOR THE PREPARATION OF ε-CAPROLACTONE

This invention relates to a process for the preparation of ε-caprolactone from at least one compound selected from the group consisting of ε-hydroxycaproic acid, low polymerization products thereof, and esters thereof. ε-Caprolactone is an important intermediate product as a material for making nylon-6 since the same can be readily converted to ε-caprolactam when reacted with ammonia.

Known methods for making ε-caprolactone include, for example, reaction of cyclohexanone with peracetic acid or hydrogen peroxide, and cyclization of ε-hydroxycaproic acid. The latter method is practiced by heating ε-hydroxycaproic acid, using NaOH halides of divalent metals, KCN, MgO, ZnO, $CdCO_3$ orthoboric acid, metaboric acid, boric anhydride, or $B_2O_3$ as the catalyst.

However, the former of the above known methods requires expensive and explosive peracetic acid or hydrogen peroxide, and the latter cyclization reaction hardly progresses smoothly, even in the presence of aforementioned catalysts according to our reproductive experiments, and furthermore side formation of complex byproducts caused by the addition of solid catalysts is unavoidable. Thus, neither of the above processes is quite satisfactory.

Accordingly, therefore, the object of the present invention is to provide a process for the preparation of ε-caprolactone with high yield, through industrially practicable easy operations, using ε-hydroxycaproic acid, low polymerization products thereof, or esters of such products, as the starting materials.

Another object of the present invention is to provide a process for the preparation of ε-caprolactone without using such expensive and explosive peroxides or such catalysts undesirable both from the standpoints of operability and side reaction, as required in the conventional methods.

Other objects and advantages of the present invention will become apparent from the following descriptions.

According to the present invention, ε-caprolactone can be produced smoothly at high yields, by heating at least one compound selected from the group consisting of ε-hydroxycaproic acid, low polymerization products thereof, and esters of such products, in the presence of a compound containing free alcoholic hydroxyl groups in such an amount that the total number of free alcoholic hydroxyl groups present in the reaction system should exceed that of carboxyl groups present in the reaction system, when each one ε-hydroxycaproic acid unit of the formula

contained in said compound is calculated as one molecule of ε-hydroxycaproic acid, at such temperature and pressure conditions as will allow distillation of ε-caprolactone.

According to the particularly preferred mode of practicing the present invention, at least one compound selected from the group consisting of ε-hydroxycaproic acid, low polymerization products thereof, and esters thereof, is heated in the presence of free alcoholic hydroxyl group satisfying the formula below.

$$X - Y \geq 0.02z$$

in which, when ester linkage is calculated as each one carboxyl group and one hydroxyl group,
X denotes the number of total hydroxyl groups present in the reaction system,
Y denotes the number of total carboxyl groups present in the reaction system, and
Z denotes the number of total carboxyl groups derived from ε-hydroxycaproic acid, low polymerization products thereof, and esters thereof, at such temperature and pressure conditions as will allow distillation of ε-caprolactone, whereby the compound of the amount as will provide a suitably excessive amount of free alcoholic hydroxyl groups can be caused to be present in the reaction system.

According to the present invention, any of the following can be used as the starting material:
a. ε-hydroxycaproic acid
b. low polymerization products of ε-hydroxycaproic acid, and
c. esters of ε-hydroxycaproic acid or low polymerization products thereof.

In the above, the low polymerization products of group b means self-condensation products of 2 to approximately 20 molecules of ε-hydroxycaproic acid, typical examples which are represented by the formula below:

in which $n$ is an integer ranging from 2 to approximately 20.

Besides the linear condensation products expressed by the above formula, the group (b) also includes cyclic condensation products formed by condensation of more than one molecule of ε-hydroxycaproic acid. In the formula above, $n$ is limited to the range of 2 to approximately 20 simply because the polymers of ε-hydroxycaproic acid are normally obtained at low degrees of polymerization such as 2 to approximately 20. Thus, condensation products with the $n$'s greater than 20 can be similarly used as the starting material in the subject process, although they have no particular advantage. Since ε-hydroxycaproic acid easily self-condenses when exposed to high temperatures as above 100°C., particularly at high concentrations and to the temperatures above 150°C., to form low condensation products as above, in many cases it is obtained in the form of mixtures of ε-hydroxycarpoic acid with low condensation products thereof, or as such low condensation products.

According to the invention, it is also possible to use ε-hydroxycaproic acid or low condensation products thereof in the form of their esters, as the starting material for making εcaprolactone. The esters can be those formed with any aliphatic or alicyclic alcohols, so far as the ester can remain in the reaction system, not rapidly distilling off, under such temperature and pressure conditions as will allow distillation of ε caprolactone, the object product, from the system. As such alcohols, normally aliphatic or alicyclic, monovalent or divalent alcohols are suitable. As later described, particularly the esters of ε-hydroxycaproic acid or low polymerization products thereof, with monovalent aliphatic or alicyclic alcohols of at least 10 carbons, or with divalent aliphatic or alicyclic alcohols of at least two carbons, inter alia, with 1,6 - hexamediol, are preferred starting materials.

In the process of this invention, such starting material as so far described is put into the reaction system and heated under the temperature and pressure conditions as will allow distillation of object ε-caprolactone from the reaction system. The important feature in that reaction is, when each one ε-hydroxycaproic acid unit ${O-(CH_2)_5CO}$, composing the ester of ε-hydroxycaproic acid, low polymer is regarded as one molecule of ε-hydroxycaproic acid, including monomeric ε-hydroxcaproic acid, the number of free alcoholic hydroxyl groups in the reaction mixture in the system should exceed that of total carboxyl groups.

According to the invention, it is particularly suitable that, when each ε-hydroxycaproic acid unit, ${O-(CH_2)_5CO}$, as aforesaid is regarded as one ε-hydroxycaproic acid molecule and when the total number of carboxyl groups in the monomeric ε-hydroxycaproic acid molecules and above hypothetical ε-hydroxycaproic acid molecules present in the reaction system is referred to as "total number of carboxyl groups in ε-hydroxycaproic acid component in the reaction system", besides the total number of hydroxyl groups (—OH) from the ε-hydroxycaproic acid component equaling that of the carboxyl groups, at least 0.02 time, preferably at least 0.05 time, inter alia, 0.1 time, the total carboxyl groups of free alcoholic hydroxyl groups should be present in the reaction mixture.

Furthermore, in the reaction system in accordance with the invention, carboxyl groups derived from each other free acids such as adipic, glutaric, succinic, and decanedicarboxylic acids, etc. may be present as mixed with the carboxyl groups derived from the ε-hydroxycaproic acid component. In such a case, it is preferred that an additional amount of alcoholic hydroxyl groups (—OH) sufficient to esterify the carboxyl groups derived from such free acids and to cap those free carboxyl groups should be present in the reaction system.

Thus, in accordance with the invention, it is preferred to heat the aforesaid starting material, in the presence of free alcoholic hydroxyl groups of the number satisfying the formula $$X - Y \geq 0.02 Z$$

in which, when each ester linkage is calculated as one carboxyl group and one hydroxyl group, X denotes the number of total groups in the reaction system, Y denotes the number of total groups in the reaction system, and Z denotes the number of total carboxyl groups derived from ε-hydroxycaproic acid, low polymerization products thereof, and esters thereof, under such temperature and pressure conditions as will allow distillation of ε-caprolactone. Above X–Y above is preferably 0.05Z and above, more preferably 0.1Z and above.

In order to cause the presence of excessive free alcoholic hydroxyl groups in the starting material of reaction mixture in the reaction system as aforesaid, any of the following may be added to the reaction system besides ε-hydroxycaproic acid, low polymers thereof or their mixtures: for example, aliphatic or alicyclic alcohols which do not rapidly distill off from the reaction system; esters of such alcohols with ε-hydroxycaproic acid or low polymers thereof; and esters of such alcohols with volatile acids which easily escape from the reaction system under the reaction conditions of the subject process, either as they are or as decomposed. Preferred donor of such free alcoholic hydroxyl groups include:

i. monovalent aliphatic or alicyclic alcohols of 10 or more carbons
ii. divalent aliphatic or alicyclic alcohols of two or more carbons, and
iii. esters of at least one of the alcohols of above groups (i) and (ii) with ε-hydroxycaproic acid or low polymers thereof.

Therefore, if the above ester group (iii) is contained in the starting material of the subject process at an amount sufficient to supply the aforesaid appropriate excess of free alcoholic hydroxyl groups, besides ε-hydroxycaproic acid and/or low polymers thereof, it is unnecessary to separately add such donor of alcoholic hydroxyl groups to the reaction system before or after initiation of the reaction. Again, if such an alcoholic hydroxyl group donor is not contained in the starting material in advance, suitable alcoholic hydroxyl group donor should be added to the starting material and/or reaction mixture, at such an amount as will cause the presence of the above-defined, appropriate excess of free alcoholic hydroxyl groups in the reaction system.

Among the preferred alcoholic hydroxyl group donors as the monovalent alcohols of group (i), for example, are n-decyl alcohol, 1 dodecanol myristyl alcohol, and stearyl alcohol. Preferred divalent alcohols of group (ii) include ethylene glycol, propylene glycol, diethylene glycol, 1,5-pentanediol, 1,6-hexanediol, 1,9-nonanediol, 1,10decanediol, 1,12-dodecanediol, etc., 1,6-hexanediol being particularly preferred.

Among the above-named, ethylene glycol, propylene glycol, and the like are distilled off from the reaction system of this invention at a relatively earlier stage, because they have boiling points lower than that of ε-caprolactone. Therefore, when such glycols are used, they may be continuously or intermittently added to the system during the reaction, to effectively practice the subject process.

There is no critical upper limit as to the carbon numbers in the monovalent and divalent alcohols. Any of such alcohols is useful so far as it maintains the liquid state under the reaction conditions suited for the invention, while normally those of not more than 30 carbons are preferred.

As the esters of ε-hydroxycaproic acid or low polymers thereof of above group (iii), those of the above-named monovalent or divalent alcohols with ε-hydroxycaproic acid or low polymers thereof are preferred. Particularly, esters of 1,6-hexanediol with ε-hydroxycaproic acid or low polymers thereof are advantageously used.

Thus, according to the invention, the aforesaid starting material and reaction mixture are heated in the reaction system containing the appropriately excessive amount of free alcoholic hydroxyl groups, under the temperature and pressure conditions as will allow distillation of object ε-caprolactone from the reaction system. Such temperature and pressure conditions allowing distillation of object ε-caprolactone are preferably selected from the reduced pressure range of 0.1–300 mm. Hg. and temperature range of 180°–340° C., particularly the pressure range of 0.5 –200 mm. Hg and temperature range of 200 –300° C. If heating temperatures much higher than the above-specified range are employed, ε-caprolactone tends to decompose. Whereas, under excessively low temperatures, formation rate of ε-caprolactone in the reaction system is reduced. Again, at higher pressures than the above-specified range, distillation of formed ε-caprolactone off from the reaction system becomes difficult. Lower pressures than the specified range on the other hand are economically objectionable, and tend to reduce the yield of ε-caprolactone, because under such low pressures distillation of said products other than ε-caprolactone, e.g., ε-caprolactone dimer, ester of ε-hydroxycaproic acid with the alcohol present in the reaction system, etc., takes place.

Under the reaction conditions as above, the starting material is subjected to complex esterification and ester-interchange reaction, etc. in the reaction system of the invention, and through such stages the ε-hydroxycaproic acid component is smoothly cyclized to provide ε-caprolactone at high yield, as distilled off from the system.

Incidentally, the construction of the apparatus for practicing the above reaction is not critical, so far as it possesses a container for reduced pressure heating of the starting material under the above-specified conditions and a member for evaporating thus formed ε-caprolactone in the container and recovering the same. Whereas, for the preparation of pure ε-caprolactone at the possible maximum yield, reaction apparatuses equipped with rectifying member to effect recirculation of vapors of starting material or of intermediate products other than ε-caprolactone into the reaction vessel, are preferred. As such rectifying member, industrially commonly employed rectification columns, such as packed tower, perforated plate tower, bubble cap tower, etc. can be used. Also as the reaction vessel for heating of the starting material and evaporation of the ε-caprolacetone formed, industrially commonly employed evaporators, for example, natural convection-type evaporator, forced circulation type an evaporator, film evaporator, etc. can be used. Besides the foregoing, evaporator of any type or model can be used as the reaction vessel of the present invention, so far as the same possesses sufficient volume to allow residence of the reaction mixture in the reaction vessel for the time required for the reaction as well as the heat-conductive area necessary for heating the starting material at the reduced pressures as specified above and evaporating the ε-caprolactone, etc. formed.

The distillate obtained in accordance with the subject process in certain cases contains, besides the object ε-caprolactone, alcohol added to the reaction system, dimer of ε-caprolactone, ester of said alcohol with ε-hydroxycaproic acid, etc. However, ε-hydroxycaproic acid itself is never present in the distillate. Isolation and recovery of ε-caprolactone from such distillate can be effected by, for example, heating the distillate under conditions which will cause the distilling off of ε-caprolactone. That is, high purity εcaprolactone can be easily obtained by rectifying the distillate, for example, at the pressure and temperature conditions as 1 mm. Hg. and approximately 70°

In practicing the subject process, it is not particularly necessary to add catalyst etc. to the reaction system. Whereas, if desired, it is permissible to add such metallic compounds which are normally known as ester-interchange catalysts, such as orthoboric acid, magnesium oxide, zinc oxide, caustic soda, magnesium chloride, etc. C., to 10 mm. Hg and 100° C.

Through the subject process as described fully above, ε-hydroxycaproic acid or low polymerization products thereof, or esters thereof, are used as the starting material and ε-caprolactone can be obtained at high yield with easy operation, without using expensive and explosive peroxides or solid catalyst. Furthermore, according to the subject process, when ε-hydroxycaproic acid or low polymers thereof used as the starting material contains another compound, for example, free acid such as adipic acid, high-purity ε-caprolactone can be produced simultaneously with separation of such other compound.

The subject process will be hereinafter explained more concretely, with reference to the working examples.

EXAMPLE 1

A mixture of composed of 20 g. (when calculated as ε-caprolactone) of ε-hydroxycaproic acid and 20 g. of 1,6-hexanediol in the form of ε-oxycaproic acid, its low polymers, their 1,6-hexanediol esters, and 1,6-hexanediol was heated and distilled in a rotary evaporator, at a bath temperature of 260° C. and pressure of 10 mm. Hg. In 1 hour, 91 percent of the total mixture was distilled off The distillate contained 45 percent of the charged amount of ε-caprolactone. The rest of ε-caprolactone component in the distillate consisted of ε-caprolactone dimer and ester of ε-hydroxycaproic acid with 1,6-hexanediol.

EXAMPLE 2

The same starting materials as employed in example 1 were heated and distilled off at the bath temperatures and reduced pressures varied in each run. The results were as shown in Table 1 below.

TABLE 1

| Example No. | Bath temp. (° C.) | Pressure (mm. Hg) | Time (min.) | Distillation ratio (percent) | ε-Caprolactone yield (percent) |
|---|---|---|---|---|---|
| 2-a | 200 | 0.3 | 30 | 29 | 6.0 |
| 2-b | 200 | 1 | 30 | 17 | 2.1 |
| 2-c | 200 | 3 | 30 | 10 | 1.6 |
| 2-d | 230 | 0.3 | 30 | 58 | 5.3 |
| 2-e | 230 | 1 | 30 | 50 | 5.5 |
| 2-f | 230 | 3 | 30 | 31 | 8.5 |
| 2-g | 230 | 10 | 30 | 21 | 4.9 |
| 2-h | 260 | 1 | 30 | 98 | 21 |
| 2-i | 260 | 3 | 30 | 98 | 32 |
| 2-j | 260 | 30 | 90 | 57 | 26 |
| 2-k | 260 | 100 | 30 | 19 | 7.3 |
| 2-l | 280 | 30 | 30 | 83 | 48 |
| 2-m | 280 | 100 | 30 | 48 | 19 |
| 2-n | 300 | 10 | 30 | 98 | 35 |
| 2-o | 300 | 30 | 30 | 99 | 46 |

In the table, the distillation ratio refers to the ratio of distilled amount to the initially charged amount of the starting material. The yield of ε-caprolactone is the ratio of distilled ε-caprolactone to the charged ε-hydroxcaproic acid.

EXAMPLE 3

Thirty g. of starting materials, in which the amount of 1,6-hexamediol to be concurrently present with ε-hydroxycaproic acid component was varied in each run, were heated and distilled for 30 minutes at 1 –30 mm. Hg. and 260° C. The results were as shown in table 2 below.

TABLE 2

| Example No. | 1,6-hexanediol/ε-hydroxycaproix acid component (by weight) | Pressure (mm. Hg) | Bath temp. (° C.) | Distillation ratio (percent) | ε-Caprolactone yield (percent) |
|---|---|---|---|---|---|
| 3-a | 0.086 | 1 | 260 | 86 | 30 |
| 3-b | 0.14 | 1 | 260 | 77 | 22 |
| 3-c | 0.29 | 1 | 260 | 98 | 43 |
| 3-d | 0.29 | 1 | 260 | 89 | 37 |
| 3-e | 0.58 | 1 | 260 | 91 | 33 |
| 3-f | 0.83 | 1 | 260 | 98 | 21 |
| 3-g | 0 | 3 | 260 | 16 | 0 |
| 3-h | 0.086 | 3 | 260 | 56 | 17 |
| 3-i | 0.83 | 3 | 260 | 98 | 32 |
| 3-j | 0 | 30 | 260 | 6.9 | 0 |
| 3-k | 0.83 | 30 | 260 | 57 | 26 |

EXAMPLE 4

Forty g. of the same starting material as employed in example 1 was heated and distilled in the identical apparatus with that employed in example 1 at the bath temperature of 260° C. and pressure of 30 mm. Hg. for 90 minutes, under the addition of named additives known as ester-interchange catalysts. The results are shown in table 3 below, together with the results of the runs in which the same additives were added to the starting material consisting of only ε-hydroxycaproic acid and low polymerization products, without the concurrent presence of 1,6-hexanediol.

TABLE 3

| Additive | 1,6-hexanediol/ε-hydroxycaproic acid component=0.83 | | 1,6-hexanediol=0 | |
|---|---|---|---|---|
| | Distillation ratio (percent) | ε-Caprolactone yield (percent) | Distillation ratio (percent) | ε-Caprolactone yield (percent) |
| H₃BO₃, 1.3 g | 57 | 26 | 6.9 | 0 |
| MgO, 2 g | 52 | 21 | 4.8 | 0.4 |
| ZnO, 2 g | 83 | 47 | 12.0 | 0 |
| NaOH, 2 g | 78 | 51 | 8.0 | 0.4 |
| MgCl₂6H₂O, 1.3 g | 67 | 26 | 11.2 | 2.5 |
| | 83 | 9.8 | 9.3 | 0 |

EXAMPLE 5

To a mixture of ε-hydroxycaproic acid component (ε-hydroxycaproic acid and low polymerization products thereof) containing 1,6-hexanediol at a weight ratio of 0.83 thereto in the form of esters of 1,6-hexanediol with ε-hydroxycaproic acid, adipic acid of the amount varied in each run was added as esters with 1,6-hexanediol or ε-hydroxycaproic acid component. The starting materials were heated and distilled for 30 minutes and a rotary evaporator, at a bath temperature of 260° C. and pressure of 1 mm. Hg. The results were shown in table 4 below.

TABLE 4

| Adipic acid component (g.)/ε-hydroxycaproic acid component (g.) | Amount of starting material (g.) | Pressure (mm. Hg) | Bath temp. (° C.) | Distillation ratio (percent) | ε-Caprolactone yield (percent) |
|---|---|---|---|---|---|
| 0.17 | 40 | 1 | 260 | 87 | 21 |
| 0.86 | 60 | 1 | 260 | 100 | 25 |

EXAMPLE 6

Sixty g. of 1,6-hexanediol ester of ε-hydroxycaproic acid, [HO(CH$_{COO(CH}$)$_6$OH], were charged in a reactor of 200 cc. in capacity equipped with a packed rectification column with the number of theoretical plates of 9 and reacted for 5.8 hours at 230° C. and under a reduced pressure of 11 mm. Hg. The reflux ratio employed during the reaction was 45/15 (sec./sec.). Thus 50.3 g. of distillate were obtained, and the distillation residue was 9.6 g. The distillate was analyzed into 29.5 g. (yield =100 percent) of ε-caprolactone and 20.8 g. of 1,6-hexanediol.

EXAMPLE 7

An oligomer of ε-hydroxycaproic acid (average degree of polymerization =7.4) and 1,6-hexanediol of each indicated amount in tables 5-1 and 5-2 were charged in a 200 cc. capacity reactor equipped with a packed rectification column with the number of theoretical plates of 9 and reacted under the conditions specified in the same table.

The results are also shown in the same table.

EXAMPLE 8

An oligomer of ε-hydroxycaproic acid (average degree of polymerization =7.4) and 1,6-hexanediol were charged in a packed rectification tower with the number of theoretical plates of 9 at various ratios, and reacted under the various conditions as indicated in tables 6-1 and 6-2 below. The results are also given in the same tables. The compositions of starting mixtures are shown in table 6-3.

TABLE 5-1

| Example No. | 7-a | 7-b | 7-c | 7-d | 7-e | 7-f | 7-g | 7-h | 7-i | 7-j |
|---|---|---|---|---|---|---|---|---|---|---|
| Caprolactone oligomer (g.) | 40 | 40 | 40 | 40 | 40 | 40 | 40 | 40 | 30 | 20 |
| 1,6-hexanediol (g.) | 0 | 0.2 | 0.5 | 1.0 | 2.0 | 4.0 | 8 | 12 | 27 | 40 |
| (X−Y)/Z | 0 | 0.0097 | 0.024 | 0.048 | 0.096 | 0.19 | 0.39 | 0.58 | 1.74 | 3.87 |
| Reaction temp. (° C.) | 260 | 260 | 256 | 257 | 257 | 261 | 257 | 260 | 256 | 260 |
| Pressure (mm. Hg) | 10 | 10 | 10 | 10 | 10 | 10 | 10 | 10 | 10 | 10 |
| Reflux ratio | 3 | 3 | 3 | 3 | 3 | 3 | 3 | 3 | 3 | 3 |
| Time (hr.) | 2.3 | 2.3 | 6.4 | 4.3 | 3.8 | 2.2 | 1.5 | 2.5 | 1.8 | 1.7 |
| Distillate: | | | | | | | | | | |
| Caprolactone (g.) | 1.3 | 0.8 | 25.5 | 31.6 | 34.1 | 34.6 | 35.1 | 40.5 | 25.9 | 16.8 |
| 1,6-hexanediol (g.) | 0 | 0 | 0.0 | 0.0 | 0.0 | 0.1 | 0.4 | 2.2 | 16.9 | 30.9 |
| Total (g.) | 1.3 | 0.8 | 25.5 | 31.6 | 34.1 | 34.7 | 35.5 | 42.7 | 42.8 | 47.7 |
| Distillation residue (g.) | 33.0 | 34.2 | 10.0 | 2.8 | 4.3 | 7.0 | 8.5 | 8.0 | 9.3 | 8.5 |
| Caprolactone yield, percent | 3.3 | 1.9 | 63.8 | 79.0 | 85.3 | 86.3 | 87.8 | 101 | 86.3 | 84.0 |

TABLE 5-2

| Example No. | 7-k | 7-l | 7-m | 7-n | 7-o | 7-p | 7-q | 7-r | 7-s |
|---|---|---|---|---|---|---|---|---|---|
| Caprolactone oligomer (g.) | 20 | 40 | 40 | 40 | 40 | 40 | 40 | 40 | 40 |
| 1,6-hexanediol (g.) | 80 | 0.2 | 0.2 | 0.2 | 0.2 | 8 | 8 | 8 | 8 |
| (X−Y)/Z | 7.74 | 0.0097 | 0.0097 | 0.0097 | 0.0097 | 0.39 | 0.39 | 0.39 | 0.39 |
| Reaction temp. (° C.) | 260 | 302 | 261 | 285 | 300 | 257 | 218 | 219 | 258 |
| Pressure (mm. Hg) | 9.5 | 11 | 3 | 2.5 | 2.5 | 20 | 9.5 | 4.0 | 51 |
| Reflux ratio | 3 | 3 | 3 | 3 | 3 | 3 | 3 | 3 | 3 |
| Time (hr.) | 1.5 | 1.8 | 1.2 | 3.8 | 3.4 | 2.0 | 4.3 | 4.3 | 2.0 |
| Distillate: | | | | | | | | | |
| Caprolactone (g.) | 16.7 | 4.2 | 4.0 | 6.8 | 7.5 | 37.2 | 35.2 | 34.8 | 35.4 |
| 1,6-hexanediol (g.) | 74.1 | 0 | 0 | 0.0 | 0.0 | 0.8 | 1.5 | 3.0 | 3.8 |
| Total (g.) | 90.8 | 4.2 | 4.0 | 6.8 | 7.5 | 38.0 | 36.7 | 37.8 | 39.2 |
| Distillation residue (g.) | 9.8 | 32.5 | 34.0 | 28.7 | 28.8 | 8.0 | 6.7 | 7.8 | 5.0 |
| Caprolactone yield, percent | 83.5 | 10.5 | 10.1 | 17.0 | 18.8 | 93.0 | 88.0 | 87.0 | 88.5 |

TABLE 6-1

| Example No. | 8-a | 8-b | 8-c | 8-d | 8-e | 8-f | 8-g | 8-h | 8-i | 8-j |
|---|---|---|---|---|---|---|---|---|---|---|
| Type of starting mixture | D | E | F | F | D | E | F | F | F | F |
| Amount of starting material (g.) | 60 | 50 | 50 | 40 | 60 | 60 | 48 | 48 | 48 | 48 |
| (X−Y)/Z | 1.63 | 0.96 | 0.39 | 0.39 | 1.63 | 0.96 | 0.39 | 0.39 | 0.39 | 0.39 |
| Reaction temperature (° C.) | 200 | 200 | 200 | 200 | 200 | 200 | 220 | 220 | 235 | 235 |
| Reaction pressure (mm. Hg) | 3.0 | 3.0 | 3.0 | 9.5 | 10 | 10 | 2.5 | 10 | 10 | 21.5 |
| Reflux ratio | 3 | 3 | 3 | 3 | 3 | 3 | 3 | 3 | 3 | 3 |
| Reaction time (hr.) | 8 | 5 | 4.7 | 5.2 | 7.2 | 5.0 | 5.1 | 3.1 | 2.3 | 2.8 |
| Distillate: | | | | | | | | | | |
| ε-Caprolactone (g.) | 25.4 | 31.2 | 29.1 | 31.4 | 29.8 | 35.2 | 32.9 | 36.3 | 37.2 | 36.4 |
| 1,6-hexanediol (g.) | 16.8 | 12.9 | 2.7 | 3.0 | 21.8 | 12.8 | 3.08 | 3.22 | 1.85 | 2.99 |
| Total (g.) | 42.2 | 44.1 | 31.8 | 31.4 | 56.6 | 48.0 | 36.0 | 39.5 | 39.1 | 39.4 |
| Distillation residue (g.) | 7.7 | 4.8 | 4.2 | 5.2 | 6.0 | 4.0 | 7.0 | 6.5 | 7.0 | 5.8 |
| ε-Caprolactone yield, percent | 77.2 | 93.3 | 87.3 | 94.2 | 90.6 | 88.0 | 82.3 | 90.8 | 93.0 | 91.0 |

TABLE 6-2

| Example No. | 8-k | 8-l | 8-m | 8-n | 8-o | 8-p | 8-q | 8-r | 8-s | 8-t |
|---|---|---|---|---|---|---|---|---|---|---|
| Type of starting mixture | D | F | F | E | E | D | F | D | E | D |
| Amount of starting material (g.) | 60 | 48 | 48 | 50 | 50 | 60 | 40 | 60 | 50 | 70 |
| (X−Y)/Z | 1.63 | 0.39 | 0.39 | 0.96 | 0.96 | 1.63 | 0.39 | 1.63 | 0.96 | 1.63 |
| Reaction Temprature (° C.) | 255 | 258 | 258 | 258 | 258 | 258 | 260 | 310 | 318 | 320 |
| Reflux ratio | 3 | 3 | 3 | 3 | 3 | 3 | 3 | 3 | 3 | 3 |
| Reaction time (hr.) | 2.0 | 1.4 | 1.3 | 1.75 | 4.7 | 1.4 | 3.2 | 2.0 | 1.75 | 3.0 |
| Distillate: | | | | | | | | | | |
| ε-Caprolactone (g.) | 29.2 | 36.6 | 36.6 | 29.2 | 29.1 | 4.12 | 30.5 | 24.8 | 26.0 | 3.61 |
| 1,6-hexanediol (g.) | 21.8 | 0.64 | 1.82 | 12.0 | 8.05 | 5.69 | 0.7 | 18.7 | 9.13 | 9.32 |
| Total (g.) | 51.0 | 37.2 | 38.4 | 41.2 | 37.2 | 9.81 | 31.2 | 43.5 | 35.1 | 12.9 |
| Distillation residue | 9.2 | 7.0 | 5.0 | 6.0 | 7.5 | 49.5 | 3.7 | 12.2 | 11.3 | 46.8 |
| ε-Caprolactone yield, percent | 88.8 | 91.5 | 91.5 | 87.3 | 87.0 | 12.1 | 91.5 | 75.4 | 77.7 | 9.4 |

TABLE 6-3

Composition of Starting Mixture
(per 100 g.)

| Type | ε-Caprolactone Component (g.) | 1,6-Hexanediol Component (g.) | Total (g.) |
|---|---|---|---|
| D | 54.9 | 45.1 | 100 |
| E | 66.7 | 33.3 | 100 |
| F | 83.3 | 16.7 | 100 |

EXAMPLE 9

Forty g. of an oligomer of ε-hydroxycaproic acid (average degree of polymerization =7.4) and 8 g. of various alcohols were charged in a 200 cc. capacity reactor equipped with a packed rectification tower with the number of theoretical plates of 9 and reacted. The results are shown in tables 7-1 and 7-2 below.

EXAMPLE 10

Forty (40) g of an oligomer of ε-hydroxycaproic acid (average degree of polymerization=7.4) and 8 g of ethylene glycol were charged into a 200-cc capacity reactor equipped with a packed rectification tower with the number of theoretical plates of 9, and reacted at 260° C. and a reduced pressure of 10 mmHg. The reflux ratio employed during the reaction was 45/15 (sec./sec.).

Three hours after the reaction started, the distillation rate was reduced. Whereupon the heating was suspended, the system was cooled, and 8 g of ethylene gylcol were newly added thereto, followed by resumption of heating. Those steps were repeated four times before completion of the reaction. The obtained contained 24.8 g of ε-caprolactone and 32 g of ethylene glycol. The yield of ε-caprolactone to the charged oligomer was 62 percent.

EXAMPLE 11

Forty (40) g of ε-hydroxycaproic acid (purity, 94.6 percent, the balance being oligomer of ε-hydroxycaproic acid) and 8 g of 1,6-hexanediol were charged into a 200-cc capacity reactor equipped with a packed rectification tower with the number of theoretical plates of 9, and reacted for 4.5 hours at a temperature of 260° C. under a reduced pressure of 10 mm Hg. The reflux ratio employed was 45/15 (sec./sec.). As the result, 38.4 g of distillate were obtained, and the distillation residue amounted 7.2 g. The distillate contained 36.0 g of ε-caprolactone, which corresponded to the yield of 86.7 percent to the charged ε-hydroxycaproic acid. Furthermore, 8.9 g of distillate were caught by the dry ice-methanol trap, most of which was water.

EXAMPLE 12

Mixtures containing ε-hydroxycaproic acid, adipic acid, and 1,6-hexanediol mostly in the form of corresponding esters were each charged in a reactor equipped with a packed rectification tower, and reacted under the various conditions indicated in the following tables 8-1 8-2, 8-3, and 8-4. The results are given in the same tables.

Also the compositions of the starting mixtures are specified in table 8-5.

TABLE 7-1

| | Example number | | | | | | |
|---|---|---|---|---|---|---|---|
| | 9-a | 9-b | 9-c | 9-d | 9-e | 9-f | 9-g |
| Type of alcohol | n-Decyl | l-dodecanol | Myristyl | Stearyl | Ethylene glycol | Propylene glycol | 1,4-butanediol |
| Amount of alcohol (g.) | 8 | 8 | 8 | 8 | 8 | 8 | 8 |
| (X−Y)/Z | 0.14 | 0.12 | 0.11 | 0.085 | 0.73 | 0.60 | 0.51 |
| Reaction temp. (° C.) | 260 | 260 | 260 | 257 | 260 | 260 | 260 |
| Reaction pressure (mm. Hg) | 10 | 10 | 12.5 | 10 | 10 | 9.2 | 10 |
| Reflux ratio | 3 | 3 | 3 | 3 | 3 | 3 | 3 |
| Time (hr.) | 6.2 | 2.7 | 2.8 | 2.8 | 4.2 | 4.2 | 3.8 |
| Distillate: | | | | | | | |
| ε-Caprolactone (g.) | 14.4 | 38.4 | 35.6 | 33.4 | 9.75 | 6.28 | 38.2 |
| Alcohol (g.) | 8.56 | 0.0 | 0.22 | 0.0 | 9.44 | 8.37 | 0.0 |
| Total (g.) | 23.1 | 38.4 | 35.8 | 33.4 | 19.2 | 14.7 | 38.2 |
| Distillation residue (g.) | 22.1 | 5.0 | 8.1 | 9.2 | 24.7 | 33.0 | 5.1 |
| ε-Caprolactone yield, percent | 36.0 | 96.0 | 89.0 | 83.5 | 24.4 | 15.7 | 95.5 |

TABLE 7-2

| | Example Number | | | | | |
|---|---|---|---|---|---|---|
| | 9-h | 9-i | 9-j | 9-k | 9-l | 9-m |
| Type of alcohol | Diethylene glycol | 1,5-pentanediol | 1,6-hexanediol | 1,9-nonanediol | 1,10-decanediol | 1,12-dodecanediol |
| Amount of alcohol (g.) | 8 | 8 | 8 | 8 | 8 | 8 |
| (X−Y)/Z | 0.44 | 0.44 | 0.38 | 0.28 | 0.26 | 0.22 |
| Reaction temp. (° C.) | 260 | 260 | 257 | 258 | 257 | 257 |
| Reaction pressure (mm. Hg) | 10 | 10 | 10 | 10 | 10 | 10 |
| Reflux ratio | 3 | 3 | 3 | 3 | 3 | 3 |
| Time (hr.) | 3.2 | 2.8 | 1.5 | 1.9 | 2.0 | 2.4 |
| Distillate: | | | | | | |
| ε-Caprolactone (g.) | 34.1 | 32.8 | 35.1 | 32.3 | 34.8 | 36.5 |
| Alcohol (g.) | 3.24 | 2.36 | 0.4 | 0.0 | 0.0 | 0.0 |
| Total (g.) | 37.3 | 35.2 | 35.5 | 32.3 | 34.8 | 36.5 |
| Distillation residue (g.) | 5.2 | 5.3 | 8.3 | 10.0 | 8.8 | 8.3 |
| ε-Caprolactone yield, percent | 85.3 | 82.0 | 87.8 | 80.8 | 87.0 | 91.3 |

TABLE 8-1

| Example No. | 12-1 | 12-2 | 12-3 | 12-4 | 12-5 | 12-6 | 12-7 | 12-8 | 12-9 | 12-10 | 12-11 | 12-12 | 12-13 |
|---|---|---|---|---|---|---|---|---|---|---|---|---|---|
| Type of starting mixture | A | A | A | A | A | A | A | A | A | A | A | A | A |
| Amount of starting material (g.) | 80 | 60 | 60 | 60 | 60 | 60 | 60 | 60 | 60 | 60 | 60 | 60 | 60 |
| (X-Y)/Z | 2.10 | 2.10 | 2.10 | 2.10 | 2.10 | 2.10 | 2.10 | 2.10 | 2.10 | 2.10 | 2.10 | 2.10 | 2.10 |
| The number of theoretical plate | 9 | 9 | 9 | 9 | 9 | 9 | 9 | 9 | 9 | 9 | 9 | 9 | 9 |
| Reaction temp. (° C.) | 220 | 220 | 255 | 256 | 254 | 265 | 224 | 230 | 205 | 200 | 180 | 295 | 300 |
| Reflux ratio | 3 | 3 | 3 | 3 | 3 | 3 | 3 | 3 | 3 | 3 | 3 | 3 | 3 |
| Reaction time (hr.) | 6.1 | 5.8 | 3.2 | 4.2 | 4.7 | 4.2 | 5.6 | 5.1 | 7.0 | 7.2 | 10.6 | 2.8 | 2.7 |
| Reaction pressure (mm. Hg) | 12 | 3.5 | 11 | 31 | 110 | 290 | 31 | 105 | 3.5 | 12 | 3 | 110 | 305 |
| Distillate: | | | | | | | | | | | | | |
| ε-Caprolactone (g.) | 29.2 | 22.2 | 21.8 | 22.8 | 19.1 | 4.5 | 20.3 | 14.5 | 19.6 | 19.8 | 15.3 | 23.9 | 15.0 |
| 1,6-hexanediol (g.) | 25.6 | 12.5 | 9.67 | 11.7 | 17.0 | 4.8 | 16.4 | 11.7 | 8.6 | 18.1 | 14.0 | 14.7 | 17.9 |
| Total (g.) | 54.8 | 34.7 | 31.5 | 34.5 | 36.1 | 9.3 | 36.7 | 26.2 | 28.2 | 37.9 | 29.3 | 41.3 | 32.9 |
| Distillation residue (g.) | 25.2 | 24.6 | 27.1 | 22.6 | 24.5 | 49.6 | 22.8 | 34.2 | 30.0 | 24.0 | 33.3 | 13.2 | 23.8 |
| ε-Caprolactone yield, percent | 95.8 | 96.9 | 95.2 | 99.6 | 83.4 | 18.7 | 89.0 | 63.6 | 86.0 | 86.8 | 66.9 | 104 | 65.6 |

TABLE 8-2

| Example No. | 12-14 | 12-15 | 12-16 | 12-17 | 12-18 | 12-19 | 12-20 | 12-21 | 12-22 | 12-23 | 12-24 |
|---|---|---|---|---|---|---|---|---|---|---|---|
| Type of starting mixture | A | A | A | B | B | B | C | A | A | A | A |
| Amount of starting material (g) | 60 | 60 | 60 | 60 | 60 | 60 | 50 | 60 | 70 | 60 | 60 |
| (X-Y)/Z | 2.10 | 2.10 | 2.10 | 0.79 | 0.79 | 0.79 | 0.12 | 2.10 | 2.10 | 2.10 | 2.10 |
| The number of theoretical plates | 9 | 9 | 9 | 9 | 9 | 9 | 9 | 9 | 9 | 9 | 9 |
| Reaction temp. (° C.) | 350 | 350 | 350 | 200 | 260 | 290 | 260 | 200 | 300 | 295 | 345 |
| Reaction pressure (mm.Hg) | 100 | 305 | 760 | 3.5 | 100 | 300 | 9.3 | 30.5 | 30 | 9.5 | 102 |
| Reflux ratio | 3 | 3 | 3 | 3 | 3 | 3 | 3 | 3 | 3 | 3 | 3 |
| Reaction time (hr.) | 1.3 | 1.8 | 1.8 | 2.4 | 5.6 | 2.7 | 4.7 | 8.7 | 2.2 | 2.1 | 1.7 |
| Distillate: | | | | | | | | | | | |
| ε-Caprolactone (g.) | 10.5 | 18.3 | 4.2 | 8.4 | 27.1 | 11.1 | 24.5 | 17.4 | 23.4 | 18.5 | 12.8 |
| 1,6-hexanediol (g.) | 8.6 | 18.7 | 7.7 | 0.9 | 3.4 | 1.8 | 0.0 | 15.4 | 23.9 | 19.3 | 10.2 |
| Total (g.) | 19.1 | 37.0 | 11.9 | 9.3 | 30.5 | 12.9 | 24.5 | 32.8 | 47.3 | 37.7 | 23.0 |
| Distillation residue (g.) | 20.3 | 16.7 | 38.2 | 46.3 | 24.0 | 21.5 | 21.5 | 33.3 | 15.1 | 10.5 | 10.5 |
| ε-Caprolactone yield, percent | 45.9 | 80.0 | 18.4 | 27.6 | 89.7 | 36.7 | 80.3 | 76.0 | 87.6 | 80.8 | 55.9 |

TABLE 8-3

| Example No. | 12-25 | 12-26 | 12-27 | 12-28 | 12-29 | 12-30 | 12-31 | 12-32 | 12-33 | 12-34 | 12-35 |
|---|---|---|---|---|---|---|---|---|---|---|---|
| Type of starting mixture | A | A | A | A | A | B | B | B | B | P-1 | P-1 |
| Amount of starting material (g.) | 60 | 60 | 60 | 60 | 60 | 60 | 60 | 60 | 60 | 100 | 100 |
| (X-Y)/Z | 2.10 | 2.10 | 2.10 | 2.10 | 2.10 | 0.79 | 0.79 | 0.79 | 0.79 | 2.30 | 2.30 |
| The number of theoretical plates | 9 | 9 | 9 | 6 | 14 | 9 | 9 | 9 | 9 | 9 | 9 |
| Reaction temp. (° C.) | 345 | 230 | 203 | 222 | 228 | 220 | 240 | 219 | 220 | 260 | 220 |
| Reaction pressure (mm. Hg) | 31 | 100 | 30 | 30.5 | 9.5 | 3.5 | 10 | 30 | 29 | 9.5 | 9.0 |
| Reflux ratio | 3 | 3 | 3 | 3 | 3 | 3 | 3 | 3 | 3 | 3 | .3 |
| Reaction time (hr.) | 1 | 8.6 | 11.5 | 8.7 | 14.7 | 9.7 | 3.2 | 5.2 | 10.4 | 6.3 | 9.7 |
| Distillate: | | | | | | | | | | | |
| ε-Caprolactone (g.) | 11.8 | 18.2 | 19.0 | 20.0 | 15.3 | 25.0 | 25.3 | 26.6 | 26.6 | 19.9 | 19.8 |
| 1,6-hexanediol (g.) | 12.2 | 13.2 | 17.2 | 18.5 | 2.2 | 4.1 | 6.9 | 6.1 | 3.1 | 22.0 | 21.1 |
| Total (g.) | 24.0 | 31.4 | 36.2 | 38.5 | 17.5 | 29.1 | 32.2 | 32.7 | 29.7 | 41.9 | 40.9 |
| Distillation residue (g.) | 18.8 | 27.3 | 23.5 | 18.8 | 36.5 | 20.0 | 20.8 | 21.5 | 23.8 | 50.5 | 55.8 |
| ε-Caprolactone yield, percent | 51.6 | 79.5 | 83.0 | 87.4 | 66.9 | 82.8 | 83.7 | 88.0 | 88.0 | 79.6 | 79.2 |

TABLE 8-4

| Example No. | 12-36 | 12-37 | 12-38 | 12-39 | 12-40 | 12-41 | 12-42 | 12-43 | 12-44 | 12-45 |
|---|---|---|---|---|---|---|---|---|---|---|
| Type of starting mixture | P-1 | P-1 | A | A | A | A | A | A | A | A |
| Amount of starting material (g) | 100 | 50 | 60 | 60 | 60 | 60 | 60 | 60 | 60 | 60 |
| (X-Y)/Z | 2.30 | 2.30 | 2.10 | 2.10 | 2.10 | 2.10 | 2.10 | 2.10 | 2.10 | 2.10 |
| The number of theoretical plates | 9 | 9 | 9 | 9 | 9 | 9 | 6 | 6 | 6 | 6 |
| Reaction temp. (° C.) | 240 | 260 | 240 | 260 | 256 | 240 | 260 | 257 | 240 | 240 |
| Reaction pressure (mm. Hg) | 9.0 | 60 | 30 | 60 | 60 | 30.5 | 30 | 30 | 60.5 | 61 |
| Reflux ratio | 3 | 3 | 3 | 1 | 3 | 1 | 3 | 1 | 1 | 3 |
| Reaction time (hr.) | 7.0 | 5.0 | 5.4 | 4.5 | 5.1 | 5.5 | 4.2 | 4.2 | 8.3 | 6.6 |
| Distillate: | | | | | | | | | | |
| ε-Caprolactone (g.) | 20.2 | 12.4 | 20.0 | 20.6 | 20.3 | 20.6 | 20.4 | 19.1 | 20.4 | 20.2 |
| 1,6-hexanediol (g.) | 20.0 | 5.9 | 17.2 | 18.1 | 16.8 | 17.2 | 20.3 | 21.0 | 19.6 | 19.2 |
| Total (g.) | 40.2 | 18.3 | 37.2 | 38.7 | 37.1 | 37.8 | 40.7 | 40.1 | 40.0 | 39.4 |
| Distillation residue (g.) | 52.5 | 30.5 | 19.3 | 19.6 | 20.3 | 20.0 | 15.2 | 16.8 | 19.5 | 19.5 |
| ε-Caprolactone yield, percent | 80.8 | 99.0 | 88.1 | 90.7 | 89.4 | 90.7 | 89.9 | 84.1 | 89.9 | 89.0 |

TABLE 8-5.—COMPOSITION OF STARTING MIXTURE
[Per 100 g.]

| | Grams | | | |
|---|---|---|---|---|
| Type | ε-Caprolactone component | Adipic acid component | 1,6-hexanediol component | Total |
| A | 38.1 | 12.2 | 51.3 | 101.6 |
| B | 50.3 | 16.1 | 33.5 | 100 |
| C | 60.9 | 19.5 | 19.5 | 100 |
| P-1 | 25.0 | 25.0 | 50.0 | 100 |

We claim:

1. A process for the preparation of εcaprolactone which comprises heating at least one compound selected from the group consisting of ε-hydroxycaproic acid, low polymerization products thereof and esters of said ε-hydroxycaproic acid and said low polymerization products thereof, in the presence of free alcoholic hydroxyl group in an amount satisfying the formula $$X - Y \geqq 0.02Z$$

wherein, calculating each ester linkage as one carboxyl group and one hydroxyl group, X denotes the number of total hydroxyl groups in the reaction system, Y denotes the number of total carboxyl groups in the reaction system, and Z denotes the number of total carboxyl groups derived from $\epsilon$-hydroxcarproic acid, said low polymerization products thereof, and said esters of $\epsilon$-hydroxycaproic acid and said low polymerization products thereof, under such temperature and pressure conditions that allow distillation of $\epsilon$-caprolactone.

2. The process of claim 2 wherein said formula is $X-Y \geqq 0.05Z$, [particularly $X-Y \geqq 0.1Z$,] wherein X, Y and Z are as previously defined.

3. The process of claim 2, wherein said formula is $$X-Y \geqq 0.1Z,$$

wherein X, Y and Z are as previously indicated.

4. A process for the preparation of $\epsilon$-caprolactone which comprises heating at least one compound selected from the group consisting of $\epsilon$-hydroxycaproic acid, low polymerization products thereof and esters of said $\epsilon$-hydroxycaproic acid and said low polymerization products thereof, in the presence of a compound containing free alcoholic hydroxyl groups in an amount such that, when one $\epsilon$-hydroxycaproic acid unit of the formula $\{O-(CH_2)_5CO\}$ contained in said compound is calculated as one molecule of $\epsilon$-hydroxycaproic acid, the total number of free alcoholic hydroxyl groups present in the reaction system exceeds the total number of carboxyl groups present in the reaction system, under such temperature and pressure conditions that allow distillation of $\epsilon$-caprolactone.

5. The process of claim 8, which comprises heating $\epsilon$-hydroxycaproic acid, low polymerization product thereof or mixture thereof, in the presence of a compound selected from (1) monovalent alkyl or alicyclic alcohols of at least 10 atoms, (2) divalent alkyl or alicyclic alcohols of at least two carbon atoms and (3) esters of (1) or (2) with $\epsilon$-hydroxycaproic acid or a low polymerization product thereof, in an amount that provides free alcoholic hydroxyl groups satisfying the formula:

$$X-Y \geqq 0.02Z$$

wherein, calculating one ester linkage as one carboxyl group and one hydroxyl group, X denotes the number of total hydroxyl groups in the reaction system, Y denotes the number of total carboxyl groups in the reaction system, and Z denotes the number of total carboxyl groups derived from $\epsilon$-hydroxycaproic acid, low polymerization products thereof, and esters thereof, at such temperature and pressure conditions that allow distillation of $\epsilon$-caprolactone.

6. The process of claims 8, which comprises heating a mixture of $\epsilon$-hydroxycaproic acid, low polymerization products thereof, and a further compound selected from 1,6-hexanediol, esters of said $\epsilon$-hydroxycaproic acid and low polymerization product with 1,6-hexanediol, and mixtures thereof, under such temperature and pressure conditions that allow distillation of $\epsilon$-caprolactone, while controlling the amount of said further compound in said groups in said mixture satisfies the formula:

$$X-Y \geqq 0.02Z$$

wherein, calculating each ester linkage as one carboxyl group and one hydroxyl group, X denotes the number of total hydroxyl groups in the reaction system, Y denotes the number of total carboxyl groups in the reaction system, and Z denotes the number of total carboxyl groups derived from $\epsilon$-hydroxycaproic acid, low polymerization products thereof and esters thereof.

7. The process of claim 8, wherein the distillation of $\epsilon$-caprolactone is performed by heating the system at a pressure within the range of 0.1 to 300 mm. Hg. and at a temperature within the range of 180°–340° C.

8. The process of claim 8 wherein said heating is performed in a vessel equipped with a rectifying means on its upper part.

* * * * *

S-466

UNITED STATES PATENT OFFICE
CERTIFICATE OF CORRECTION

Patent No. 3,624,258  Dated November 13, 1971

Inventor(s) SACHIO ISHIMOTO ET AL

It is certified that error appears in the above-identified patent and that said Letters Patent are hereby corrected as shown below:

Claim 5, line 37, after "10", insert -- carbon --.

Column 13, line 34, and Column 14, lines 14, 35 and 39, claim reference numeral "8" should read -- 4 --.

Signed and sealed this 9th day of May 1972.

(SEAL)
Attest:

EDWARD M. FLETCHER, JR.
Attesting Officer

ROBERT GOTTSCHALK
Commissioner of Patents